United States Patent [19]

Corbett et al.

[11] 3,976,301

[45] Aug. 24, 1976

[54] RECORD SELECTOR MECHANISM FOR A PHONOGRAPH SYSTEM

[75] Inventors: Michael J. Corbett, North Tonawanda; Alvin S. Topolski, Tonawanda, both of N.Y.

[73] Assignee: The Wurlitzer Company, Chicago, Ill.

[22] Filed: Mar. 3, 1975

[21] Appl. No.: 554,583

[52] U.S. Cl. .......... 274/10 D; 274/10 C

[51] Int. Cl.$^2$ .......... G11B 17/22

[58] Field of Search .......... 274/10 C, 10 D

[56] References Cited

UNITED STATES PATENTS

| | | | |
|---|---|---|---|
| 2,175,142 | 10/1939 | Andres | 274/10 C |
| 2,952,463 | 9/1960 | Vanderzee et al. | 274/10 D |
| 2,984,491 | 5/1961 | Cavallo et al. | 274/10 C |
| 3,246,899 | 4/1966 | Badenroder | 274/2 |
| 3,402,935 | 9/1968 | Kitazawa | 274/10 C |

FOREIGN PATENTS OR APPLICATIONS

| | | | |
|---|---|---|---|
| 1,100,597 | 4/1955 | France | 274/10 D |

*Primary Examiner*—Richard E. Aegerter
*Assistant Examiner*—Steven L. Stephan
*Attorney, Agent, or Firm*—Olson, Trexler, Wolters, Bushnell & Fosse, Ltd.

[57] ABSTRACT

The embodiment of the invention disclosed herein is directed to a record selector mechanism which includes a plurality of spaced-apart records to be individually selected and played by a transducer. The plurality of spaced-apart records are secured by coupling means to a common support shaft element and simultaneously rotated at playing speed. A transducer member is secured to a transport mechanism to be positioned adjacent the record to be played. The transport mechanism includes means for urging the transducer in either one of two directions so as to engage a selected one of diametrically opposed record surfaces which are rotating. A slide pointer is mounted at the exterior of the housing and movable along a linear path and adjacent spaced-apart indicia. The indicia identifies the records within the phonograph system and the pointer is used to select the desired record. The slide mechanism includes an actuator to be manipulated when the slide is adjacent indicia corresponding to the desired record.

11 Claims, 6 Drawing Figures

RECORD SELECTOR MECHANISM FOR A PHONOGRAPH SYSTEM

BACKGROUND OF THE INVENTION

This invention relates generally to phonograph systems, and more particularly, to a juke box type phonograph system wherein a plurality of records are individually selected for playing through coin-operated means. Specifically, the invention is directed to a low-cost, low maintenance phonograph system wherein selected ones of a plurality of records are played.

Heretofore, phonograph systems of the juke box type included a large quantity of records, sometimes in the order of 100 to 200 or more, which are mounted in a toroidal tray or magazine. The torodial tray or magazine may be rotatable about a central axis to place a desired record at a playing station, or, in the alternative, means may be provided for removing a record from the toroidal tray and moving the removed record about the central axis of the toroidal tray to place it in registry with a playing station. In either case, the complex mechanism required for rotating the toroidal tray or moving the record removal mechanism requires highly skilled and trained personnel for maintaining the equipment. Furthermore, such mechanical mechanisms are relatively expensive in that they require relatively high tolerance to be maintained in the components used and require a substantial number of discrete elements to be assembled. Once again, the assembly of such mechanisms require the training of skilled personnel.

Furthermore, prior art types of phonograph systems of the juke box type include complicated selector mechanisms. Generally, this type of juke box has a pluralilty of push buttons divided into two groups, one group being identified by the letters of the alphabet and a second group being identified by discrete numerals. As is well known, a selection is made by actuating certain ones of the buttons in each group. This requires complicated selector mechanisms, which may be either mechanical or electronic in nature. Here again, the skill required to maintain the prior art type of selector mechanism is substantial, to say the least.

In many foreign countries, where technical expertise is at a premium, the manpower required to install, service and maintain juke box type of phonograph systems is at a minimum, and in some cases, nonexistent. Therefore, present-day sophisticated juke box systems are not practical for use in such underdeveloped foreign countries.

SUMMARY OF THE INVENTION

Accordingly, it is an object of this invention to provide a new and improved phonograph system of the juke box type which has all of the advantages of present sophisticated juke box systems but which has a minimum of moving parts, and hence is simple to maintain by those having a minimal amount of technical skill.

Another object of this invention is to provide a new and improved phonograph system of the juke box type which is small and light in weight to facilitate shipping to foreign countries at a minimum cost.

Still another object of this invention is to provide a new and improved phonograph system wherein the plurality of records associated therewith do not move from their playing station, thereby eliminating the need for complex transfer mechanisms to transport the record from its storage position to a playing position.

Yet another object of this invention is to provide a new and improved phonograph system which is simple and efficient to manufacture without necessitating the requirement for maintaining accurate tolerances of parts for efficient and reliable operation.

Briefly, the phonograph system of the present invention consists of a linear stack of records supported approximately 7/8 inch apart by spring-loaded spools or coupling elements along a common axis passing through the center of the records. The spools are stacked together to form a keyed spindle which is in the order of about 17 inches long, more or less, upon which all of the records are mounted. All of the records turn simultaneously at playing speed when any one of the records is played and the play selection is determined by placing a two-sided tone arm between a pair of the records to play the one that has been selected. Therefore, the present invention provides a phonograph system which eliminates record handling other than for rotating at playing speed. A lightweight tone arm support mechanism moves from one selection to another selection by motor drive means. Because of the relatively short distance of movement of the tone arm from one selection to another selection, the time between selections is relatively short.

The tone arm support carriage moves in a linear fashion, either vertically or horizontally, depending on the orientation of the stack of records, and is easily adapted to a mechanical selector and memory. The memory enables the customer to physically move a slide element to a selected position, corresponding to the desired record to be played, and push an actuating button on the slide element to effect the selection. The selector button directly or indirectly sets a particular mechanical pin mechanism of the memory which corresponds to the position of the slide element. The selector system can include a plurality of different elements for its operation, as for example, pulleys, cables, solenoids, knobs, etc. which would enable a flexible cabinet design for the phonograph system when used as a juke box. The overall structure of the phonograph system of the present invention is substantially simplified in that much of the mechanical work presently done by automatic means in the juke box is now done in a simple manner by the customer when scanning and making a selection. This eliminates the scanning mechanism within the machine to remove a record from a storage position and place it in a playing position. The tone arm mechanism includes means for playing the top or the bottom of a vertical stack of records or the left and right records of a horizontal stack of records. A bistable tone arm control is provided to play either of the adjacent sides of the two records which are spaced apart inch. The natural movement and position of the tone arm is controlled to provide a 5 gram stylus pressure during playing of the record. If the tone arm is weighted upward it would position on the bottom of the upper record, in a vertical stack, and the record stack would be rotated in the opposite direction. If the tone arm is weighted downward, it would position on the top of the lower record, in a vertical stack, and the record would be rotated in the normal direction of rotation. The 5 gram control weight of the stylus is controlled by a bistable tone arm control mechanism and automatically applies pressure to the tone arm in the right direction for playing the upper or lower records or the left and right record, whichever the case may be.

The juke box phonograph system of this invention also includes a record-now-playing indicator which is formed by mounting an indicating light on the tone arm transport carriage, which indicating light would illuminate a numbered panel having indicia corresponding to the records in the stack. Therefore, the indicia illuminated by the light while a record is playing indicates which record is then and there being reproduced.

The phonograph system of this invention, when used as a juke box, can incorporate a playmeter system. This would consist of a pendulum-type mechanism which, when cocked and released, strikes upon a row of pins adjacent to the record stack. The pendulum would swing when the tone arm mechanism starts movement. This arrangement would be mounted on the tone arm carriage or transport plate and would thereby automatically be positioned in front of the specific pin related to the record being played.

The phonograph system of the present invention has substantial advantages in that it is modular in construction and none of the modules interfere with other modules during replacement for servicing.

Many other objects, features and advantages of this invention will be more fully realized and understood from the following detailed description when taken in conjunction with the accompanying drawings wherein like reference numerals throughout the various views of the drawings are intended to designate similar elements or components.

DETAILED DESCRIPTION OF THE ILLUSTRATED EMBODIMENT

Figures 1, 3, 4, 5, 6:
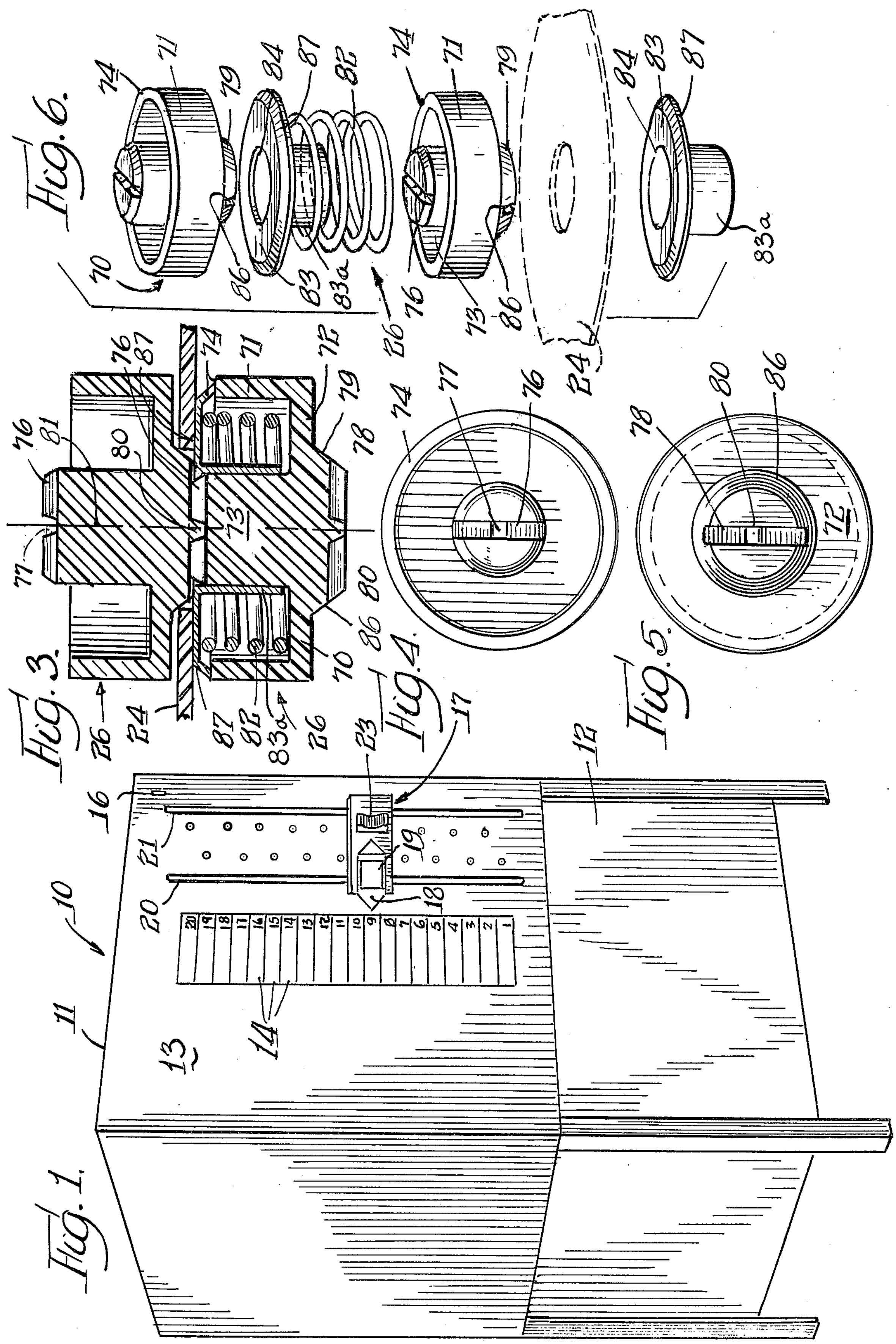
FIG. 1 is a perspective view of a juke box utilizing the phonograph system of this invention.
FIG. 3 is a sectional view of a coupling arrangement for stacking a plurality of records on a common axis for simultaneous rotation.
FIG. 4 is a top view of the coupling element of FIG. 3.
FIG. 5 is a bottom view of the coupling element of FIG. 3.
FIG. 6 is an exploded view illustrating the assembly of the coupling elements for clamping together a plurality of spaced-apart stacked records.

Referring now to FIG. 1 there is seen a diagrammatic representation of a juke box housing structure designated generally by reference numeral 10 and which provides a housing for a phonograph system constructed in accordance with the principles of this invention. The housing 10 includes an upper cabinet portion 11 for containing the mechanical components of the phonographic system and a lower cabinet portion 12 for containing the speaker system. The lower cabinet portion 12 may also include the power supply and audio amplifier components necessary for reproducing sound from record means or the like.

The housing 10, in the illustrated embodiment, includes a front wall 13 formed on the upper portion 11 to provide a surface for containing a plurality of indicia designated generally by reference numeral 14. The indicia 14 corresponds to information of the record selections available in the juke box. The indicia 14 is here illustrated as being horizontally disposed and vertically spaced-apart and corresponding in number to the number of selections available. For example, the number of selections available in the illustrated embodiment may be 40, this corresponding to 20 records having an individual play on each side of each record.

The juke box housing 10 includes coin receptacle means 16 associated with coin-operated actuating mechanisms, of any suitable well-known type, for initiating operation of the electronic and electrical components within the cabinet. Also associated with the coin-actuated mechanism may be credit-accumulating means for enabling bonus credit selections. For example, a single coin of a given monetary value may provide a single selection while a coin of greater monetary value may provide three or more selections. Furthermore, the credit accumulator may include means for accumulating coin credits of lower denomination coins.

Most advantageously, the juke box structure 10 includes a slide element 17 vertically movable along a linear path and immediately adjacent the vertical arrangement of indicia. The slide element 17 includes a pointer 18 which is close to numbers or the like corresponding to the numbers of plays which can be selected. A release element 19, when depressed, enables the slide member 17 to be moved vertically so that the pointer 18 can be placed next to the desired selection. A pair of slots 20 and 21 are formed in the front wall 13 and means pass through the slots between the slide element 17 and guide rods within the cabinet, to be described hereinbelow, to provide support for the slide element. An actuator or selection button 23 is also mounted on the slide member 17 and is used to effect the selection of a record when the slide member 17 is positioned so that the pointer 18 is adjacent the indicia corresponding to the desired record. The slide member 17, therefore, provides a substantial improvement in record selection in that it greatly simplifies the selection process and the mechanism required. Prior art devices using push buttons containing letters and numbers are complicated whereas a single slide member movable along a path and providing means to point to the desired selection is a much simpler approach. Furthermore, the slide member 17 may include locking and unlocking means as well as including the selector button 23 for finalizing the selection once the slide element is in its desired position.

Figure 2:
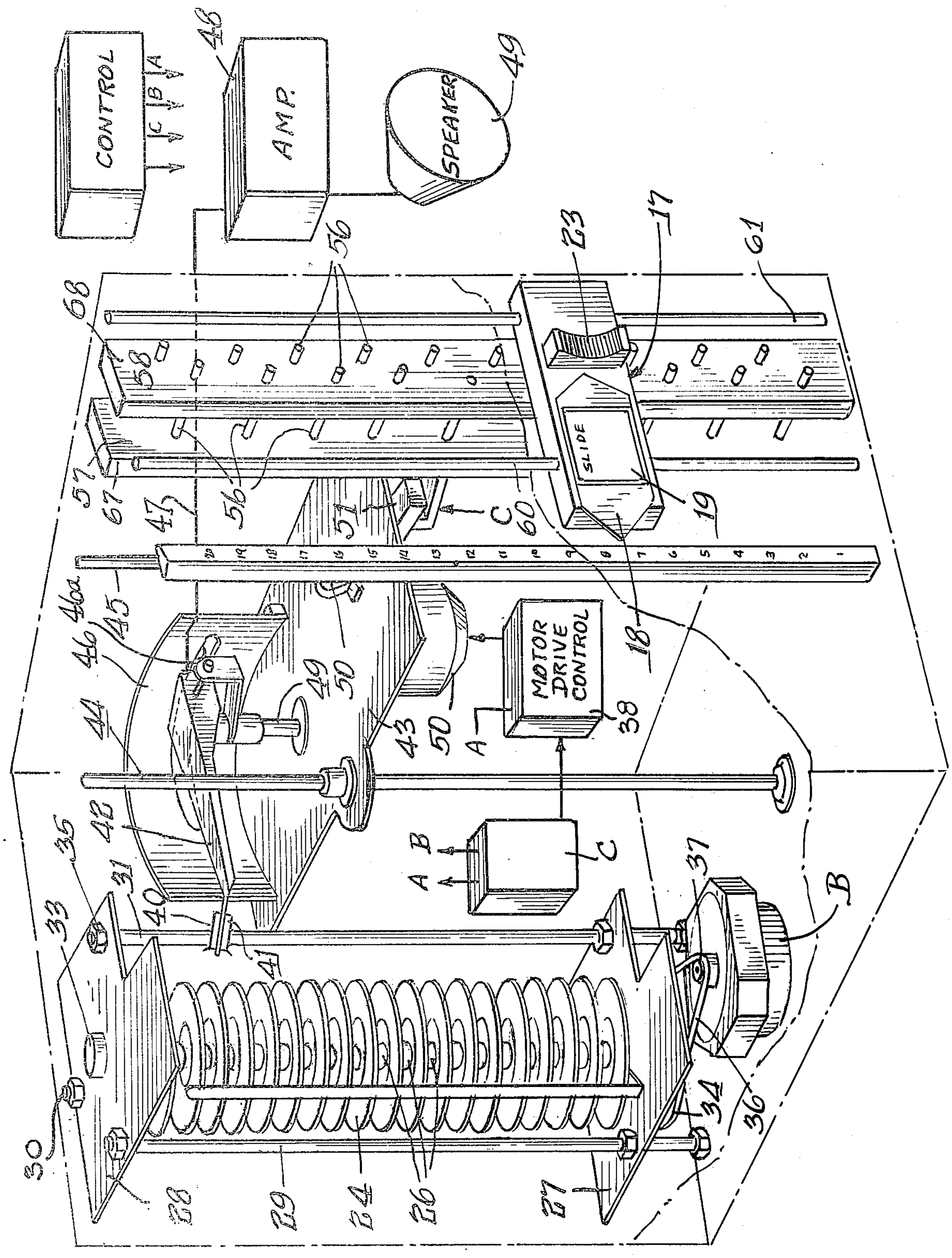
FIG. 2 is a fragmentary perspective view of the phonograph system of this invention with portions of the exterior walls thereof broken away to illustrate the mechanical components.

Referring now to FIG. 2 there is seen a perspective view of a phonograph system constructed in accordance with the principles of this invention and wherein fragmentary portions of the surrounding housing are broken away for clarity. Here it can be seen that a plurality of spaced-apart records 24 are supported about a central axis passing therethrough. The records 24 are supported on a modular shaft comprising a plurality of spacers or couplings 26 located between each record. The overall structure of the couplings 26 will be described in greater detail hereinbelow. Suffice it to say that the records 24 are mounted upon a central shaft member and adapted to be rotated at playing speed simultaneously when any one of the records is played. The records 24 are mounted between support plates 27 and 28 which, in turn, are maintained in parallel spaced-apart alignment by support rods 29, 30 and 31. While only three support rods are illustrated herein, it will be understood that more or less support rods can be utilized. Furthermore, other means may be provided for supporting the plurality of records upon their common rotatable axis.

An endcap or bearing 33 is provided at the top support plate 28 while thrust bearing means, not shown, is provided at the bottom plate 27. A pulley 34 is secured to a stub shaft element, not seen on the drawing, and beneath the plate 27. A belt 36, or other drive-engaging element is wrapped about the pulley 34 and engages a drive pulley 37 associated with a constant speed reversible motor 38. While the illustrated embodiment utilizes a reversible motor for changing the direction of rotation of the stack of records, it will be understood that other reversible means, such as transmission or gear means, may be utilized.

A pair of transducers 40 and 41, preferably being of the conventional phonograph stylus type, are mounted to a tone arm 42. The tone arm 42 is mounted to a movable support plate 43, or other suitable transport means, and moved vertically along a pair of parallel spaced-apart shafts 44 and 45. The tone arm 42 includes means for biasing the tone arm in either the up direction or the down direction. Furthermore, the tone arm has an output cable 47 over which the audio signal information is delivered to suitable amplifier means 48 for reproduction in the speaker system 49.

Either the tone arm 42 separately, or the entire support plate 43 is movable toward and away from the stack of records. The styli 40 and 41 are so dimensioned so as to fit between spaced apart records such that, upon proper biasing of the tone arm, stylus 40 engages the undersurface of the top record while stylus 41 engages the top surface of the bottom record.

The tone arm 42 preferably is pivotally mounted upon a support shaft 49 to enable the tone arm to track across the record following the grooves formed therein in a conventional and well-known manner. When tone arm 41 engages the top surface of the bottom record, the stack of records 24 are rotated clockwise in a conventional manner. However, should the control of the phonograph system apply bias to the tone arm so it engages the underside of the top record, the entire stack of records rotates in a counter-clockwise direction as a result of reverse operation of the motor 38.

The movable support plate 43 is driven by a motor 50 vertically upwardly and downwardly along the support shafts 44 and 45. The support plate includes a sensing element 51 which will sense a particular selected position and stop movement of the support plate. The tone arm is then operated to place the styli 40 and 41 between a pair of records, one of which corresponds to the selected record. Suitable controls are then energized to effect the direction of bias applied to the tone arm so it will play either the top surface of the bottom record or the bottom surface of the top record. The tone arm 42 is controlled by a cam plate 46. A rod, not seen, on the back of the tone arm follows the cam cutout 46a to a machine stop position to place the tone arm over the starting groove of the record. Further travel of the cam releases the stop of the tone arm and enables it to float in the groove during the playing operation. The motor 50 may include suitable motor drive control means 52 for changing the direction of operation of the motor for raising and lowering of the support plate.

The phonograph system of this invention is greatly simplified in that the selection operation is effected by the use of the slide member 17, as described with regard to FIG. 1. The pointer 18 moves along a plurality of numbers which, in turn, may have corresponding indicia adjacent thereto to indicate the type of selection available at that location. When the slide member 17 is positioned at a desired location, the selector button 23 is depressed to insert or actuate one of a plurality of selector pins 56. The selector pins 56 are slidable between a pair of spaced-apart vertical support members 57 and 58. When one of the pins 56 is depressed, it protrudes inwardly toward the movable support plate 53 and provides a sensing finger to engage the positioning sensor 51. This will actuate the positioning device 51 and provide a control signal to stop movement of the support plate 43.

To provide means for smooth operation of the slide element 17, a pair of spaced-apart vertical slide rods 60 and 61 are provided. However, it will be understood that other means may be incorporated for providing slide operation of a selector as set forth in conjunction with the present invention.

Referring now to FIGS. 3, 4, 5 and 6, the details of construction of the coupling or spool element used to assemble the stack of records is illustrated. Here a pair of coupling elements 26 will be illustrated with a single record 24 located therebetween. It will be understood that all of the coupling elements are substantially of the same construction and only a single element need be described in detail. The coupling elements include a circular cup-shaped member 70 having an annular sidewall or sidewalls 71 and a bottom wall 72. A cylindrical post 73 is formed integral with the bottom wall 72 and extends upwardly therefrom a distance slightly greater than the upper edge 74 of the annular sidewall. The upper portion of the post 73 includes a male meember 76 having a notch 77 formed substantially centrally thereof. The male member 76 is so configurated to engage a recess 78 formed in a boss 79 located at the exterior surface of the bottom wall 72. The recess 78 has a proturberance 80 substantially centrally thereof to engage with the notch 77 formed substantially centrally of the male member. Therefore, the coupling members are stacked and keyed together along a central axis 81. A biasing member, here illustrated as a helical spring 82, is positioned within the cup-shaped member between the bottom wall and an apertured plate 83. The apertured plate 83 includes an aperture 84 to receive the post 72. The record 24 has the apertured portion thereof fitted over the boss 79. Preferably, the thickness of the record 24 is greater than that of the space between the apertured plate 83 and the correspondingly adjacent engaging boss portion 79 of the next coupling member. This provides means for automatically compensating for inadequacies in tolerances along the length of the stack of records and also insures that each of the records 24 will be firmly held in a fixed position relative to the axis 81 so that all of the records simultaneously rotate at an accurate playing speed. The apertured plate 84 is provided with a beveled annular edge 87 which overlies, and may engage the upper annular edge 74 of the wall 71 when the assembly is compressed. The apertured disk will therefore act somewhat as a resilient spring washer element in its environment. Furthermore, it will be noted that the boss 79 located at the lower wall of the coupling has an annular beveled surface 86 which is dimensioned so as to receive the apertured portion of the record, the inner periphery here being designated by reference numeral 84. Therefore, the flanged or annular taper 86 provides automatic centering of the record when it is placed in the stack and the coupling units assembled as illustrated. The apertured plate 83 is provided with a cylindrical portion 83a which is dimensioned so as to fit about the cylindrical post 73. This maintains the assembly in proper alignment. It will be noted that the axial extent of the cylindrical portion 83a is less than the axial extent of the post 73 and thereby provides means for compressing the assembly for holding records in place. It will be noted that the entire assembly can be loosened and records removed at any of the record-holding positions along the spool assembly.

While the assembly illustrated herein has particular utility when used in conjunction with 45 rpm records having a relatively large aperture in the center thereof, it will be noted that the spool elements can be constructed of smaller diameter components to accommodate 78 and 33 rpm records.

What has been described is a simple and efficient phonograph system which can be used to form an inexpensive juke box structure requiring minimum number of movable components, and, thereby being substantially maintenance-free for long periods of time. While a single specific embodiment of the present invention has been illustrated herein, it will be understood that variations and modifications may be effected without departing from the spirit and scope of the novel concepts as set forth in the following claims.

The invention is claimed as follows:

1. In a phonograph system, the combination comprising: a plurality of spaced-apart record means to be individually selected and played, transducer means for engagement with a selected one of said plurality of spaced-apart record means, transport means coupled to said transducer means for moving said transducer means from one selected record means to another selected record means, drive means for simultaneously driving all of said record means within said plurality of record means at a playing speed, whereby only the selected one of said plurality of record means is reproduced, selector means for providing random selection of the record means to be reproduced, and sensing means responsive to said selector means and engageable with said transport means for stopping said transport means when at a position corresponding to the selected record means, said selector means including a plurality of spaced-apart indicia-bearing elements formed on said phonograph, a movable member movable along said elements for positioning adjacent a selected one of said plurality of spaced-apart indicia-bearing elements to represent a selected one of said plurality of record means, and actuator means mounted on and movable with said selector means for manipulation by an operator for cooperating with said transport means to position said transducer means adjacent the selected record means for playing said record means being disk-shaped and having apertures formed substantially centrally thereof, coupling means positioned within the apertures of said disk-shaped records, and alignment means associated with said coupling means for maintaining the axis of rotation of said disk-shaped records substantially in alignment, said coupling means including a circular cup-shaped member having annular sidewalls and a bottom wall, and a post extending from said bottom wall substantially axially of said sidewalls and protruding beyond the edges of said sidewalls, an apertured plate located over said post and extending radially outwardly therefrom to overlie said annular sidewall biasing means positioned between said bottom wall and said apertured plate for urging said apertured plate away from said bottom wall, said post being dimensioned to receive the aperture formed within said disk-shaped record, and pressure means overlying said apertured plate and said post to capture said disk-shaped therebetween.

2. The combination as set forth in claim 1 wherein said pressure means is formed by a second cup-shaped member of substantially the same configuration as said first cup-shaped member.

3. The combination as set forth in claim 2 wherein said plurality of spaced-apart disk-shaped records are maintained axially aligned by a corresponding plurality of cup-shaped members, apertured plates, and wherein key means is formed at the exterior of the bottom wall of each of said cup-shaped members and at the top of said post for maintaining axial alignment for said plurality of cup-shaped members and wherein said bias means between said bottom wall of said cup-shaped member and said apertured plate provides dimensional tolerance compensating means for maintaining said plurality of disk-shaped records firmly positioned about their central axis.

4. In a phonograph system, the combination comprising: a plurality of spaced-apart record means to be individually selected and played, selector means for enabling a user to select particular ones of said plurality of spaced-apart record means for playing, transducer means for engagement with a selected one of said plurality of spaced-apart record means, transport means responsive to said selector means and coupled to said transducer means for moving said transducer means from one position to another to engage selected ones of said plurality of spaced apart record means, said selector means including linearly spaced-apart indicia identifying each record means of said plurality of record means, said selector means being positioned adjacent said linear indicia and movable linearly adjacent thereto to be positioned adjacent discrete indicia for selecting particular record means, and actuator means mounted on said selector means for manipulation by the operator for controlling the transport means to position said transducer means adjacent a selected record means for playing, said coupling means including a circular cup-shaped member having annular sidewalls and a bottom wall, and a post extending from said bottom wall substantially axially of said sidewalls and protruding from the upper extent of said sidewalls, and apertured plate located over said post and extending radially outwardly therefrom to overlie said annual sidewall, biasing means positioned between said bottom wall and said apertured plate for urging said apertured plate away from said bottom wall, said post means dimensioned to receive the aperture formed within said disk-shaped record, and pressure means overlying said apertured plate and said post to capture said disk-shaped record therebetween.

5. The combination as set forth in claim 4 wherein said pressure means is formed by a second cup-shaped member of substantially the same configuration as said first cup-shaped member.

6. The combination as set forth in claim 4 wherein said plurality of spaced-apart disk-shaped records are maintained axially aligned by a corresponding plurality of said cup-shaped members, apertured plates, and wherein key means is formed at the exterior of the bottom wall of said cup-shaped member and at the top of said post for maintaining axial alignment of said plurality of cup-shaped members and wherein said bias means between said bottom wall and said apertured plate provide dimensional tolerance compensating means for maintaining said plurality of disk-shaped records firmly positioned about their central axis.

7. In a phonograph system, the combination comprising: a housing, a plurality of spaced-apart record means mounted within said housing to be individually selected and played, transducer means within said housing for engaging a selected one of said plurality of spaced-apart record means during playing thereof, a plurality of spaced-apart indicia formed on a said housing, each discrete indicia repersenting a particular one of said plurality of spaced-apart record means, a movable member movable along said indicia for positioning adjacent a selected discrete indicia of said plurality of indicia for selecting a record means to be played and actuator means movable with said member and manually operable to condition said selector means for the playing of said selected record means said selector means including a slide element positioned at the exterior of said housing, a pair of spaced apart parallel rods mounted at the interior of said housing, and means coupled between said slide element and said spaced-apart parallel rods for enabling said slide element to move linearly along the path of said rods to be positioned adjacent a selected indicia on said housing and wherein said actuator means is mounted on said slide element and moves therewith.

8. The combination as set forth in claim 7 wherein said selector means includes a plurality of movable elements respectively corresponding to said record means and each movable between selected and non-selected positions, actuator means being mounted on said selector means for manipulation by an operator manually to move an element from non-selected to selected position for controlling the transport of said transducer means relative to said record means.

9. The combination as set forth in claim 7 wherein said indicia on said housing is formed along a linear path, and said selector means moves linearly adjacent thereto and includes planar means to be positioned adjacent discrete indicia of said plurality of said plurality of indicia during selecting of a particular record means to be played.

10. The combination as set forth in claim 7 further including a plurality of movable pins corresponding a number to the number of selections which can be made from said plurality of record means, said actuator means being engageable with selected ones of said pins for moving the same to a position which will effect indexing between the selected one of said plurality of record means and said transducer means to enable playing of the selected record.

11. In a phonograph system, the combination comprising: an axle shaft comprising a plurality of successively adjacent shaft segments having complementary interfitting protuberence and recess means at the confronting ends of said segments so that each segment is locked for rotation with the rest of said segments, said shaft segments having means thereon for holding an apertured disk record clampingly between adjacent shaft segments, means clamping said shaft segments together from the ends of said shaft to form a functionally continuous shaft, drive means for simultaneously rotating all of the said records and said shaft at a predetermined record reproducing speed, transducer means for engagement with a selected one of said plurality of records, and transport means interconnecting said shaft and said transducer means for moving said transducer means relative to said shaft in a direction axially of said shaft whereby to reproduce selected ones of said records.

* * * * *